Feb. 19, 1929.
F. J. MOSCH ET AL
1,702,479
REMOTE CONTROL SYSTEM
Filed April 3, 1925
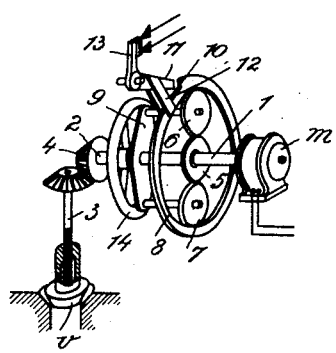
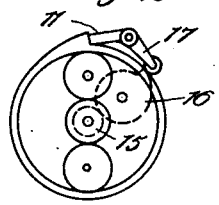
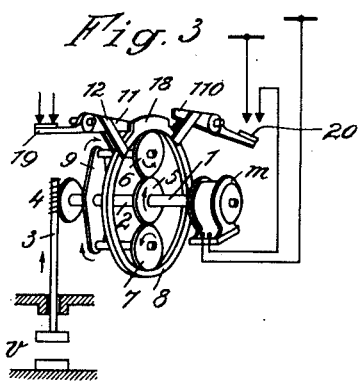
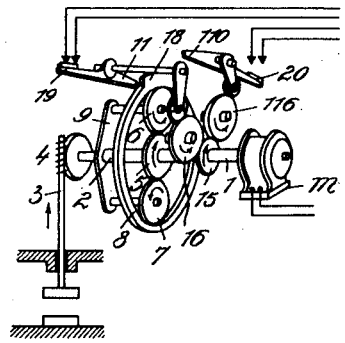
Inventors
Franz Joseph Mosch, and
Hans Höfler
by Knight Bros
attorneys Patented Feb. 19, 1929.

1,702,479

UNITED STATES PATENT OFFICE.

FRANZ JOSEF MOSCH, OF BERLIN-SIEMENSSTADT, AND HANS HÖFLER, OF BERLIN-CHARLOTTENBURG, GERMANY, ASSIGNORS, BY MESNE ASSIGNMENTS, TO WESTINGHOUSE ELECTRIC & MANUFACTURING COMPANY, A CORPORATION OF PENNSYLVANIA.

REMOTE-CONTROL SYSTEM.

Application filed April 3, 1925, Serial No. 20,572, and in Germany April 5, 1924.

Our invention relates to a remote-control system for the operation, at a distance, of valves and similar parts of machinery, such as rams for presses, stamps and the like.

One of the objects of our invention is to provide a device adapted to limit the torque applied to a driven mechanism to a definite maximum value.

Another object of our invention is to provide a valve-operating device adapted to be positively engaged during part of the operating cycle and to be limited to a definite maximum torque during the remainder of the cycle.

Heretofore, valves have been operated at a distance by a device comprising an electric motor operating through a bevel-gear set. The motor was started by closing a switch at the operator's station and was stopped by a limit switch actuated by stops on the valve body or the spindle.

However, this arrangement was subject to the disadvantage that it was either necessary to stop the motor before the valve was completely closed or risk overstressing and damaging the apparatus in an attempt to close the valve tightly. An improvement was made upon this device by placing a slip clutch between the motor and the valve, but even this measure was not perfectly satisfactory. It is not only necessary to be able to adjust the pressure with which the valve is closed, but the apparatus must also provide a greater torque for opening the valve than is allowable for closing it. These conditions are, however, both completely fulfilled by our present invention.

The requirements of the opening and closing operation are met in our design by so locking the motor to the valve during the opening movement that the maximum torque may be applied to the valve-stem to overcome the static friction and the inertia of the gear train and by limiting the torque which can be applied during the closing motion of the valve by means of a pawl that is adapted to release at a predetermined pressure corresponding to the maximum allowable torque.

In the accompanying drawings:

Fig. 1 is a diagrammatic perspective view of a valve-operating mechanism embodying the principle of our invention.

Fig. 2 is a diagrammatic view, in elevation, of a modification of our invention, and Figs. 3 and 4 are diagrammatic perspective views of further modifications of the invention.

Referring to Fig. 1 of the drawings, the remote-control system embodying our invention comprises a motor $m$ that is directly connected to a driving shaft 1 and operates a valve $v$ through the medium of a driven shaft 2 that is connected to a spindle 3 of the valve $v$ by means of a bevel gearing 4. The driving shaft 1 transmits the torque of the motor $m$ to the driven shaft 2, through a differential mechanism that comprises a sun gear 5 that is mounted on the shaft 1, a planetary system including planet gears 6 and 7 and a supporting spider 9 that is mounted upon the driven shaft 2 and a ring gear 8 that encircles the planetary system and engages the planet gears 6 and 7.

The ring gear 8 is provided with a lug 10 having a slightly angular face on its outer periphery that is adapted to engage a pivoted pawl 11. A spring 12 is provided for biasing the pawl 11 against the periphery of the ring gear 8, and an arm 13 on the pawl 11 serves to operate an interrupting switch that controls the motor $m$.

The valve is opened manually by means of the hand wheel 14. During the opening operation, the ring gear 8 rotates in the opposite direction to that in which it rotates when the valve is being closed, and the pawl 11 is raised by the sloping side of the lug 10 so that it does not interfere with the motion of the ring gear 8.

When the motor $m$ is energized, the sun gear 5 causes the planetary gears 6 and 7 to rotate upon their spindles and they, in turn, tend to rotate the ring gear 8. However, because of the engagement of the pawl 11 with the lug 10, the ring gear is restrained and the spider 9, therefore, forced to rotate within it at a speed less than the speed of the driving shaft 1. The rotation of the spider 9 effects the closing of the valve $v$ by means of the shaft 2 and the gearing 4. As soon as the valve $v$ is closed, the torque exerted by the motor is increased to such an extent that the pawl 11 is forced out of engagement with the lug 10 because of the slight angularity of their engaging faces and against the tension of the spring 12. The ring gear 8 is thus made free to turn, and all torsional stress upon the driven shaft 2 is removed. Simultaneously with the release of the ring gear 8, the arm 13 opens the input circuit of the motor and it drifts to a stop.

The modification of our invention shown in Fig. 2 is adapted to positively lock the transmission device during the first part of the closing operation in order that the full torque of the motor may be applied to overcome the static friction and the inertia of the moving parts. This device is especially useful in connection with valves that are not frequently operated and that may become corroded or otherwise stuck in the open position.

This end is obtained by means of a cam 16 that engages an arm 17 on the pawl 11 in such manner that the pawl is held in engagement with the gear rim 8 during the first part of the valve-closing movement, as shown in Fig. 2. The pawl 11 is released during the latter part of the movement by the gear wheel 15 which engages the cam 16 and rotates it to the release position.

Fig. 3 illustrates a modification of our invention that is adapted to perform both the closing and the opening operation by means of the motor $m$. The ring gear 8 in this device is provided with a lug 18 having two engaging faces, one for each direction of rotation and adapted to engage the pawl 11, and a second pawl 110. The second pawl 110 serves to restrain the ring gear against rotation during the opening movement and releases the ring gear when the increase in the motor torque indicates that the valve has been opened to its full extent. Limit switches 19 and 20 are provided on the pawls 11 and 110, respectively, and serve to de-energize the motor $m$ as soon as the closing or opening operations are completed. The reversal of the motor $m$ is accomplished at the operator's station.

The further modification of our invention shown in Fig. 4 comprises the apparatus shown in Fig. 3 and, in addition, the cam 16 shown in Fig. 2, and a second similar cam 116. The cams 16 and 116 are both driven from the gear wheel 15 and are so arranged that the cam 16 holds the pawl 11 in engagement with the ring gear 8 during the first part of the closing motion, as previously explained, and the cam 116 holds the pawl 110 in engagement with the ring gear during the initial opening of the valve.

This device embodies all of the elements necessary for the satisfactory operation of a valve at a distance, and is complete, in that it is adapted to meet all contingencies, such as a stuck valve stem in either the open or closed position, any tendency for the valve to overtravel in either direction, or any obstruction, such as a stone upon the valve seat, that would cause breakage or other serious damage in a valve not protected by the torque-limiting feature of our remote-control mechanism.

Although we have described and illustrated specific embodiments of our invention, it will be obvious to those skilled in the art that many other modifications may be made in the general design and details of construction of our remote-control system without departing from the spirit and scope of the invention as set forth in the appended claims.

We claim:

1. In an electric remote control device for valves, the combination of a coupling between the driving and the driven part adapted to normally prevent overloading of the parts of the drive, and means for locking the parts of the drive which transmit the torque to the valve to be controlled in such manner that said parts can be highly loaded at the beginning of the opening or closing of the valve.

2. In an electric remote control device for valves, the combination of a coupling between the driving and the driven part adapted to normally prevent overloading of the parts of the drive, and means for locking the parts of the drive which transmit the torque to the valve to be controlled in such manner that said parts can be highly loaded at the beginning of the opening or closing of the valve, comprising a controllable pawl adapted to lock said driving parts to a limited extent but to give way at a predetermined counter pressure.

3. In an electric remote control device for valves, the combination of a coupling between the driving and the driven part adapted to normally prevent overloading of the parts of the drive, and means for locking the parts of the drive which transmit the torque to the valve to be controlled in such manner that said parts can be highly loaded at the beginning of the opening or closing of the valve, comprising a controllable pawl adapted to lock said driving parts to a limited extent but to give way at a predetermined counter pressure, and springs adapted to keep said pawl in the locking position.

4. In an electric remote control device for valves, the combination of a coupling between the driving and the driven part adapted to normally prevent overloading of the parts of the drive, and means for locking the parts of the drive which transmit the torque to the valve to be controlled in such manner that said parts can be highly loaded at the beginning of the opening or closing of said valve, comprising a controllable pawl adapted to lock said driving parts to a limited extent but to give way at a predetermined counter pressure, said pawl being adapted to control the limit switches of the driving motor.

5. In an electric remote control device for valves, the combination of a coupling between the driving and the driven part adapted to normally prevent overloading of the parts of the drive, and means for locking the parts of the drive which transmit the torque to the valve to be controlled in such manner that said parts can be highly loaded at the beginning of the opening or closing of said valve, comprising a controllable pawl adapted to lock said driving parts to a limited extent but to give way at a predetermined counter pressure, and springs adapted to keep said pawl in the locking position, said pawl being adapted to control the limit switches of the driving motor.

6. In a transmission system, an electric motor, a driven member, a differential mechanism comprising a sun gear, planetary gears and a ring gear interposed between said motor and driven member, and means for restraining the ring gear from rotating, said means being adapted to release said ring gear when a predetermined maximum torque is applied to the driven member.

7. In a transmission system, an electric motor, a driven member, a differential mechanism comprising a sun gear, planetary gears and a ring gear interposed between said motor and driven member and means for restraining the ring gear from rotating, said means being adapted to release said ring gear when a predetermined maximum torque is applied to the driven member during part of the operating cycle, and means for locking the ring gear against rotation during the remaining part of the operating cycle of the system.

In testimony whereof we affix our signatures.

FRANZ JOSEF MOSCH.
HANS HÖFLER.